United States Patent
Clark et al.

(10) Patent No.: US 9,721,023 B2
(45) Date of Patent: *Aug. 1, 2017

(54) SEARCH QUERY OBFUSCATION VIA BROADENED SUBQUERIES AND RECOMBINING

(71) Applicant: International Business Machines Corporation, Armonk, NY (US)

(72) Inventors: Adam T. Clark, Mantorville, MN (US); Brian J. Cragun, Rochester, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,200

(22) Filed: Dec. 12, 2014

(65) Prior Publication Data

US 2015/0100564 A1  Apr. 9, 2015

Related U.S. Application Data

(63) Continuation of application No. 13/955,195, filed on Jul. 31, 2013.

(51) Int. Cl.
*G06F 17/30* (2006.01)

(52) U.S. Cl.
CPC .. *G06F 17/30867* (2013.01); *G06F 17/30451* (2013.01); *G06F 17/30672* (2013.01); *G06F 17/30734* (2013.01)

(58) Field of Classification Search
CPC ......... G06F 17/30401; G06F 17/30442; G06F 17/30448; G06F 17/30451; G06F 17/30663; G06F 17/30666; G06F 17/30672; G06F 17/30734; G06F 17/30867; G06F 17/30905

See application file for complete search history.

(56) References Cited

U.S. PATENT DOCUMENTS

| | | | | | |
|---|---|---|---|---|---|
| 5,864,846 | A | * | 1/1999 | Voorhees | G06F 17/30864 |
| 5,987,606 | A | * | 11/1999 | Cirasole | G06F 17/30867 |
| | | | | | 707/E17.109 |
| 6,006,218 | A | * | 12/1999 | Breese | G06F 17/30864 |
| 6,018,733 | A | * | 1/2000 | Kirsch | G06F 17/3061 |

(Continued)

OTHER PUBLICATIONS

Appendix P: List of IBM Patents or Patent Applications Treated as Related.

(Continued)

*Primary Examiner* — Mariela Reyes
*Assistant Examiner* — Edward Jacobs
(74) *Attorney, Agent, or Firm* — Patterson + Sheridan, LLP

(57) ABSTRACT

System, method, and computer program product to perform an operation to obfuscate search queries via broadened subqueries and recombining, by referencing an ontology to identify a set of generalized terms corresponding to at least one term of a received query, generating a plurality of subqueries based on the received query and the set of generalized terms, executing each of the plurality of subqueries to retrieve a result set for each respective subquery, and filtering the result sets using the received query to produce a result set responsive to the received query.

9 Claims, 4 Drawing Sheets

(56) References Cited

U.S. PATENT DOCUMENTS

| | | | | |
|---|---|---|---|---|
| 6,327,590 | B1* | 12/2001 | Chidlovskii | G06F 17/30867 707/734 |
| 7,181,446 | B2* | 2/2007 | Bossman | G06F 17/30451 707/714 |
| 7,685,118 | B2* | 3/2010 | Zhang | G06F 17/30734 706/45 |
| 7,752,195 | B1* | 7/2010 | Hohwald | G06F 17/30312 707/715 |
| 7,783,668 | B2* | 8/2010 | Vogel | G06F 17/30734 707/696 |
| 7,801,876 | B1* | 9/2010 | Riley | G06F 17/30864 707/706 |
| 8,150,823 | B2* | 4/2012 | Hamano | G06F 17/30864 707/705 |
| 8,533,191 | B1* | 9/2013 | Cohen | G06F 17/30864 707/735 |
| 2002/0038431 | A1* | 3/2002 | Chesko | H04L 63/04 726/26 |
| 2002/0143827 | A1* | 10/2002 | Crandall | G06F 17/2775 715/256 |
| 2005/0027691 | A1* | 2/2005 | Brin | G06F 17/30424 |
| 2005/0027699 | A1* | 2/2005 | Awadallah | G06F 17/30867 |
| 2005/0149500 | A1* | 7/2005 | Marmaros | G06F 17/30864 |
| 2005/0149510 | A1* | 7/2005 | Shafrir | G06F 17/30734 |
| 2006/0047632 | A1* | 3/2006 | Zhang | G06F 17/30734 |
| 2007/0150458 | A1* | 6/2007 | Chung | H04N 21/438 |
| 2007/0208726 | A1* | 9/2007 | Krishnaprasad | G06F 17/30663 |
| 2008/0040317 | A1* | 2/2008 | Dettinger | G06F 17/30442 |
| 2008/0133585 | A1* | 6/2008 | Vogel | G06F 17/30864 |
| 2009/0089277 | A1* | 4/2009 | Cheslow | G06F 17/30401 |
| 2009/0112838 | A1* | 4/2009 | Eggebraaten | G06F 17/30734 |
| 2010/0023509 | A1* | 1/2010 | Adachi | G06F 17/30864 707/E17.014 |
| 2010/0223261 | A1* | 9/2010 | Sarkar | G06F 17/30705 707/726 |
| 2010/0312779 | A1* | 12/2010 | Lim | G06F 17/3064 707/759 |
| 2010/0332583 | A1* | 12/2010 | Szabo | G06F 17/30522 709/202 |
| 2011/0004588 | A1* | 1/2011 | Leitersdorf | G06F 17/30864 707/711 |
| 2011/0113038 | A1* | 5/2011 | Corbin | G06F 17/30672 707/748 |
| 2011/0153592 | A1* | 6/2011 | DeMarcken | G06Q 10/02 707/713 |
| 2011/0161176 | A1* | 6/2011 | Ai | G06F 21/6254 705/14.66 |
| 2011/0179021 | A1* | 7/2011 | Wen | G06F 17/30265 707/723 |
| 2011/0252013 | A1* | 10/2011 | Lempel | G06F 17/30696 707/706 |
| 2011/0258212 | A1* | 10/2011 | Lu | G06F 17/30864 707/760 |
| 2012/0158702 | A1* | 6/2012 | Kumar | G06F 17/30303 707/723 |
| 2012/0221542 | A1* | 8/2012 | Deng | G06F 17/30451 707/706 |
| 2013/0166529 | A1* | 6/2013 | Shuster | G06F 17/30867 707/706 |

OTHER PUBLICATIONS

U.S. Appl. No. 13/955,195, entitled Search Query Obfuscation via Broadened Subqueries and Recombining, filed Jul. 31, 2013.

* cited by examiner

SEARCH QUERY OBFUSCATION VIA BROADENED SUBQUERIES AND RECOMBINING

CROSS-REFERENCE TO RELATED APPLICATIONS

This application is a continuation of co-pending U.S. patent application Ser. No. 13/955,195, filed Jul. 31, 2013. The aforementioned related patent application is herein incorporated by reference in its entirety.

BACKGROUND

The present disclosure relates to computer software, and more specifically, to computer software which obfuscates search query terms via broadened subqueries and recombining.

Anonymous web browsing is an important capability, but anonymity alone is insufficient when the ideas being searched for are valuable themselves. Using a search engine to research information can reveal the basic concepts and specific details of an idea, and leave a trail of interest and intent that may undermine the confidentiality needed for the idea. This may be problematic for things that must remain confidential, such as a business acquisition, acquiring prime land, establishing a trademark, or filing a patent application.

SUMMARY

Embodiments disclosed herein provide a system, method, and computer program product to perform an operation to obfuscate search queries via broadened subqueries and recombining, by referencing an ontology to identify a set of generalized terms corresponding to at least one term of a received query, generating a plurality of subqueries based on the received query and the set of generalized terms, executing each of the plurality of subqueries to retrieve a result set for each respective subquery, and filtering the result sets using the received query to produce a result set responsive to the received query.

DETAILED DESCRIPTION

Embodiments disclosed herein facilitate the use of public search engines in a way that hides the content and intent of searches to preserve confidentiality and anonymity of the search subject matter while still resulting in a complete set of search results. Typically, it is a combination of all elements of a query that reveal the "secret," or subject matter of a query. For a given query, embodiments disclosed herein deconstruct the query into a set of subqueries such that no single subquery contains each element of the query, but such that the collective set of subqueries covers each element of the query. Each of the subqueries may change the terms (or words, concepts, and the like) of the original query, with some subqueries having more specific variants of terms in the query, while others subqueries may have broader, more generalized variants of terms the query. One or more search engines may then be used to execute each of the subqueries, producing broad sets of overlapping results. The original query may then be applied to the overlapping result sets as a filter to yield the final desired query results.

Figure 1:
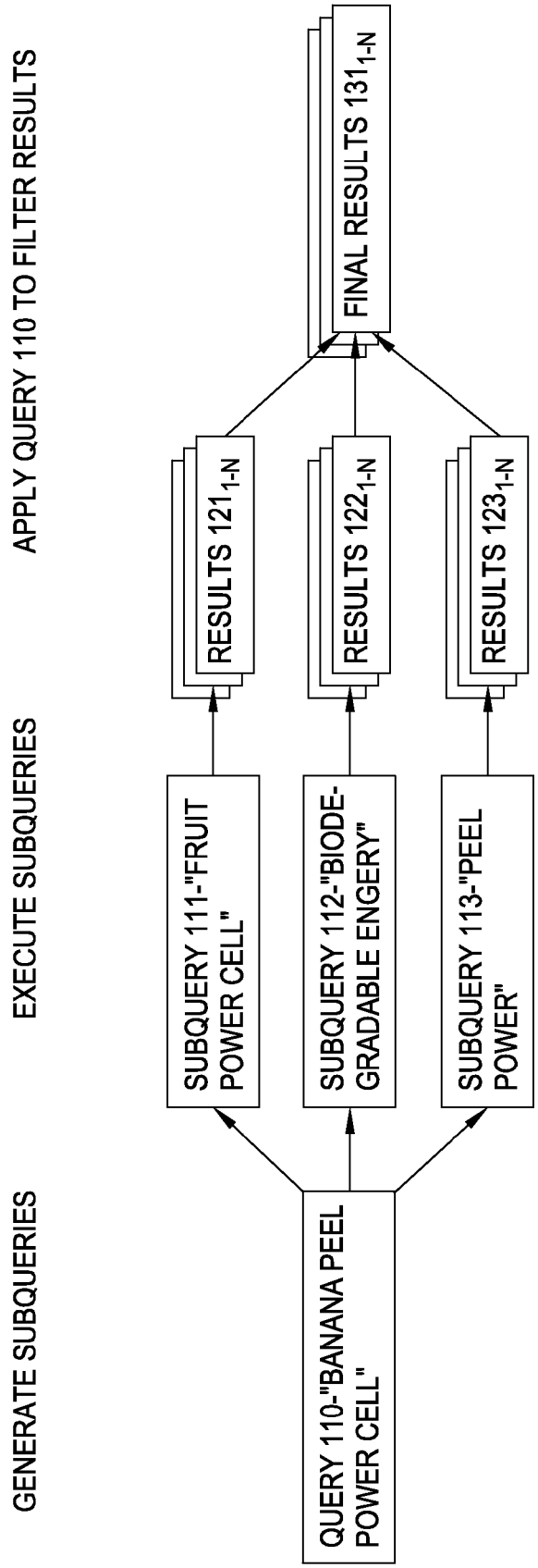
FIG. 1 illustrates techniques to obfuscate search query content via broadened subqueries, according to one embodiment.

FIG. 1 illustrates techniques 100 to obfuscate search query content via broadened subqueries, according to one embodiment. As shown, a query 110 may be received from a user specifying the search terms "banana peel power cell." For purposes of the example, assume that the user discovered a way to create power cells using banana peels. Sending the complete query 110 to a conventional search engine may leave a trail of information related to the query 110, and could compromise the secrecy of the user's idea. As such, the user may trigger an indication to preserve the secrecy of his idea by causing a system to generate a plurality of subqueries based on the query 110. As shown, the system has generated three subqueries 111-113, although any number of subqueries may be produced. Subquery 111 reads "fruit power cell," while subquery 112 reads "biodegradable energy," and subquery 113 reads "peel power." In one embodiment, an ontology is used to map terms from the original query 110 to terms used in of the subqueries 111-113. Advantageously, none of the subqueries 111-113 includes each element of the query 110, namely the overall concept of a "banana peel power cell." However, in combination, the subqueries 111-113 cover each element of the query 110.

In another embodiment, overlapping queries may be constructed such that generality in one subquery is offset with specificity in another subquery. The ontology may be used to identify synonyms and hypernyms (using ISA relationships) to further broaden and support the breakdown of the query into broader subqueries. Keywords for broadening may be utilized, and may be based on a subject matter domain of the query. For example, the "banana peel power cell" query string may result in subqueries specifying "banana peel uses," "alternative power cells," and "alternative electricity sources." In a further embodiment, highly sensitive words may be identified and removed from the queries, and saved as a post-search filter. For example, if a query is searching for the subject matter of an invention, "inventive" search terms such as "patent," "invention," and "novel" may be removed from the subqueries, or restricted from being used in the subqueries.

Once the subqueries 111-113 have been generated, the system may execute the subqueries to produce a respective result set for each subquery. In one embodiment, one search engine may execute the subqueries 111-113. In another embodiment, more than one search engine may be used to execute the subqueries 111-113 in order to provide enhanced security and protection. For example, search engine A may execute subquery 111, search engine B may execute subquery 112, and search engine C may execute subquery 113. As shown, executing subquery 111 returns a first result set $121_{1-N}$, executing subquery 112 returns a second result set $122_{1-N}$, and executing subquery 113 returns a third result set $123_{1-N}$. Generally, executing the subqueries 111-113 casts a broader search, and returns broader, overlapping result sets, i.e., result set $121_{1-N}$, result set $122_{1-N}$, and result set $123_{1-N}$. However, the system may combine the overlapping result sets, and apply the query 110 to each of the result sets as a filter to yield a final result set 131$_{1-N}$, which is responsive to the query 110.

Figure 2:
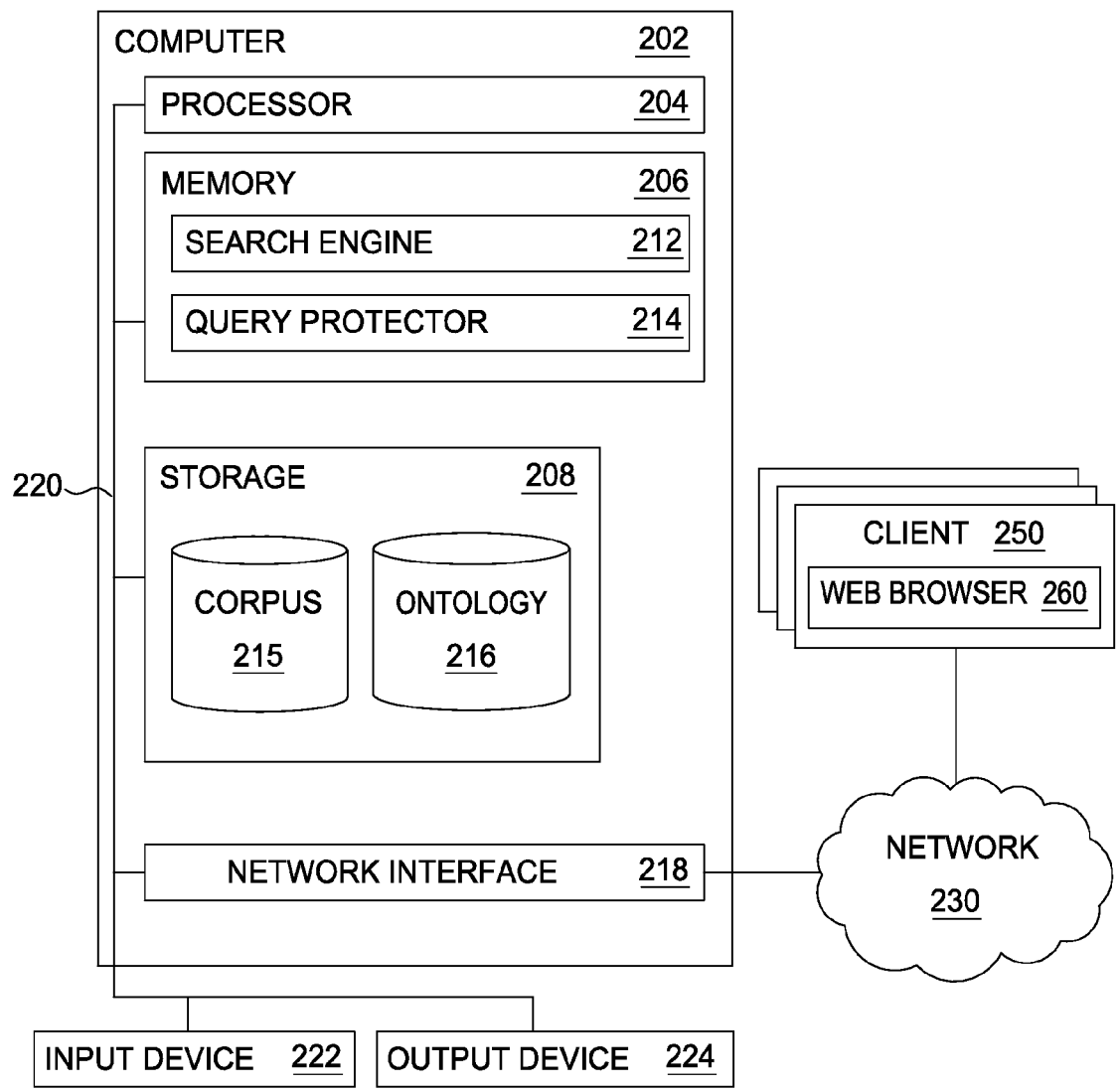
FIG. 2 illustrates a system to obfuscate search query content via broadened subqueries, according to one embodiment.

FIG. 2 illustrates a system 200 to obfuscate search query content via broadened subqueries, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains a search engine 212, which is an application generally configured to receive search queries from a user and execute the queries against a corpus of information 215 to retrieve and return relevant results as responsive to the search query. The memory 206 also contains a query protector 214, which is an application configured to modify search terms in a search query in order to preserve secrecy and confidentiality of sensitive subject matter expressed in the query. In order to do so, the search protector 214 may reference the ontology 216 to identify variants of the terms and concepts found in the query. The query protector 214 may use these variants to construct a plurality of subqueries, none of which contain all elements of the query, but collectively contain all elements of the query. The query protector 214 may then submit the subqueries to the search engine 212 (or send some queries to different search engines on the same or other computers). Once the search engine 212 processes the subqueries to retrieve respective result sets, the query protector 214 may use the original query as a filter against the result sets to produce a single result set which is responsive to the original query. Although shown as separate applications, in one embodiment, the query protector 214 is an integrated component of the search engine 212. In still another embodiment, the query protector 214 is an application executing on the client computer 250, where it may be a standalone application, or a component of the web browser 260.

As shown, the storage 208 includes a corpus 215, which is a collection of documents, web pages, images, files, and other information that can be stored and searched by the search engine 212. For example, the corpus 215 may contain scholarly articles, dictionary definitions, encyclopedia references, and the like. The storage 208 also includes the ontology 216, which provides a structural framework for organizing information. An ontology formally represents knowledge as a set of concepts within a domain, and the relationships between those concepts.

Figure 3:
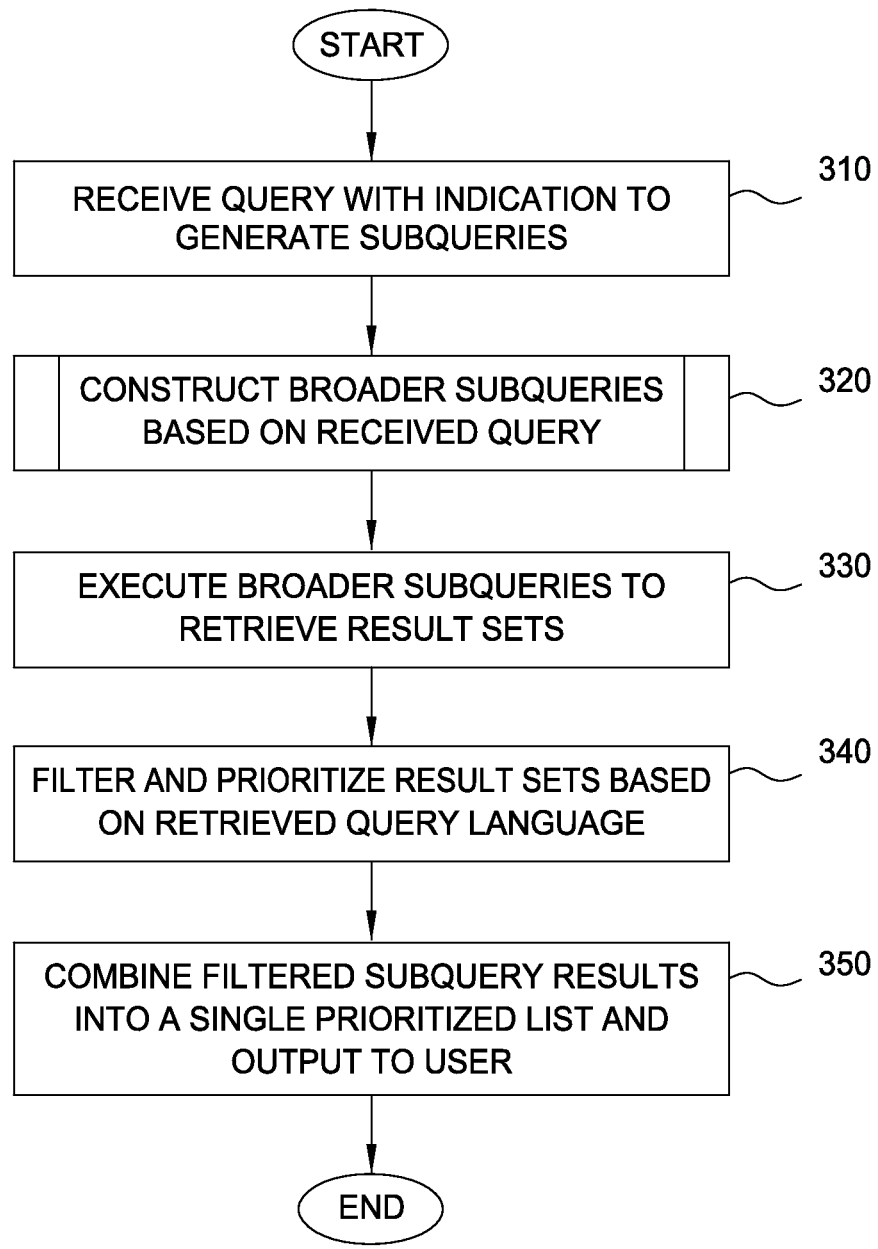
FIG. 3 is a flow chart illustrating a method to obfuscate search query content via broadened subqueries, according to one embodiment.

FIG. 3 is a flow chart illustrating a method 300 to obfuscate search query content via broadened subqueries, according to one embodiment. Generally, a computer program implementing the steps of the method 300 may protect the secrecy and confidentiality of the content of a search query by generating a number of broader subqueries based on the query and applying the query as a filter against the result sets obtained by executing the subqueries to produce a result set responsive to the query. The subqueries are generated such that none contain all elements of the original query, but that all elements are covered in one or more searches. Using fewer elements in each individual subquery may result in a broader search, however, the combination of the search results may reveal an overlapping set of results. The overlapping results are combined using the original complete combination in the query as a filter to yield the final result set. In one embodiment, the steps of the method 300 are performed by the query protector 214 and the search engine 212.

At step 310, the query protector 214 receives a query that includes an indication to generate subqueries. A user may provide the indication when submitting the query, which is tantamount to stating that the contents, concepts, or ideas in the query string are sensitive, and need to be obfuscated in order to be protected. The indication may be provided in any feasible manner, such as clicking a checkbox when submitting the query. At step 320, discussed in greater detail with reference to FIG. 4, the query protector 214 may construct broader subqueries based on the received query. Generally, the subqueries are reduced queries relative to the received query, as they use fewer or broader elements such that no single subquery contains all elements of the received query, but that all elements are included in one or more subqueries. The subqueries may be generated by referencing an ontology to automatically change one, some, or all of the search terms in the query to be vaguer than the user's query. Continuing with the above example, if the user's query is "banana peel power cell," the ontology may be used to construct subqueries that read "fruit power," "biodegradable energy," "fruit power cell," "banana power," and any other number of queries. The ontology may be used to identify synonyms and hypernyms (using ISA relationships) to further broaden and support the breakdown of the query into broader subqueries. In one embodiment, overlapping subqueries may be constructed so as to offset generality in one subquery with specificity in another subquery.

In still another embodiment, highly sensitive words may be identified in the query, and restricted from being used in the generated subqueries. The user may specify that a particular word is highly sensitive, or the query protector 214 may analyze the terms in the query to identify sensitive words. In one embodiment, the query protector 214 may utilize the inverse document frequency (IDF) of the term in the corpus 215 to determine that the word is highly sensitive, as its rate of occurrence falls below a specified threshold. Additionally, the query protector 214 may analyze a location of the query words (or terms) in the ontology 216 to identify the specificity of the word. If the word appears as a leaf node in the ontology, the query protector 214 may determine that the word exceeds a specificity threshold, and identify it as a sensitive word. Once identified, the sensitive words are excluded from the subqueries, and used as a filter against the search results.

At step 330, the query protector 214 may send the subqueries to the search engine 212, where they are executed against the corpus 215 to retrieve result sets for each subquery. In one embodiment, the query protector 214 may send the subqueries to multiple search engines to further reduce the potential of observation, as no single search engine would receive and execute all of the subqueries. The query protector 214 may also apply other techniques to obfuscate the query, such as varying the timing of subquery submission and execution, and generating dummy subqueries for execution along with the other subqueries. At step 340, the query protector 214 may filter and prioritize the result sets obtained at step 330 using the original query language. By applying the query language specified by the user at step 310 to the result sets, a supplemental search may be conducted against a more limited corpus of information, reducing noise in the broader subquery results, and identifying the best results for the received query. In one embodiment, additional weight is given to results containing the previously identified sensitive words. Additionally, subquery results coming from websites matching content profiles may be given greater weight. For example, patent websites may be given additional sorting weight when searching for prior art. Advantageously, the query protector 214, having generated the subqueries, knows what each term or concept a given subquery targets, and may use this information in filtering the results using the received query. In one embodiment, the query protector 214 performs the filtering at a user's local machine, rather than on a remote server hosting the search engines. At step 350, the query protector 214 may combine the filtered subquery results into a single prioritized list, and output the list to the user as responsive to the received query.

Figure 4:
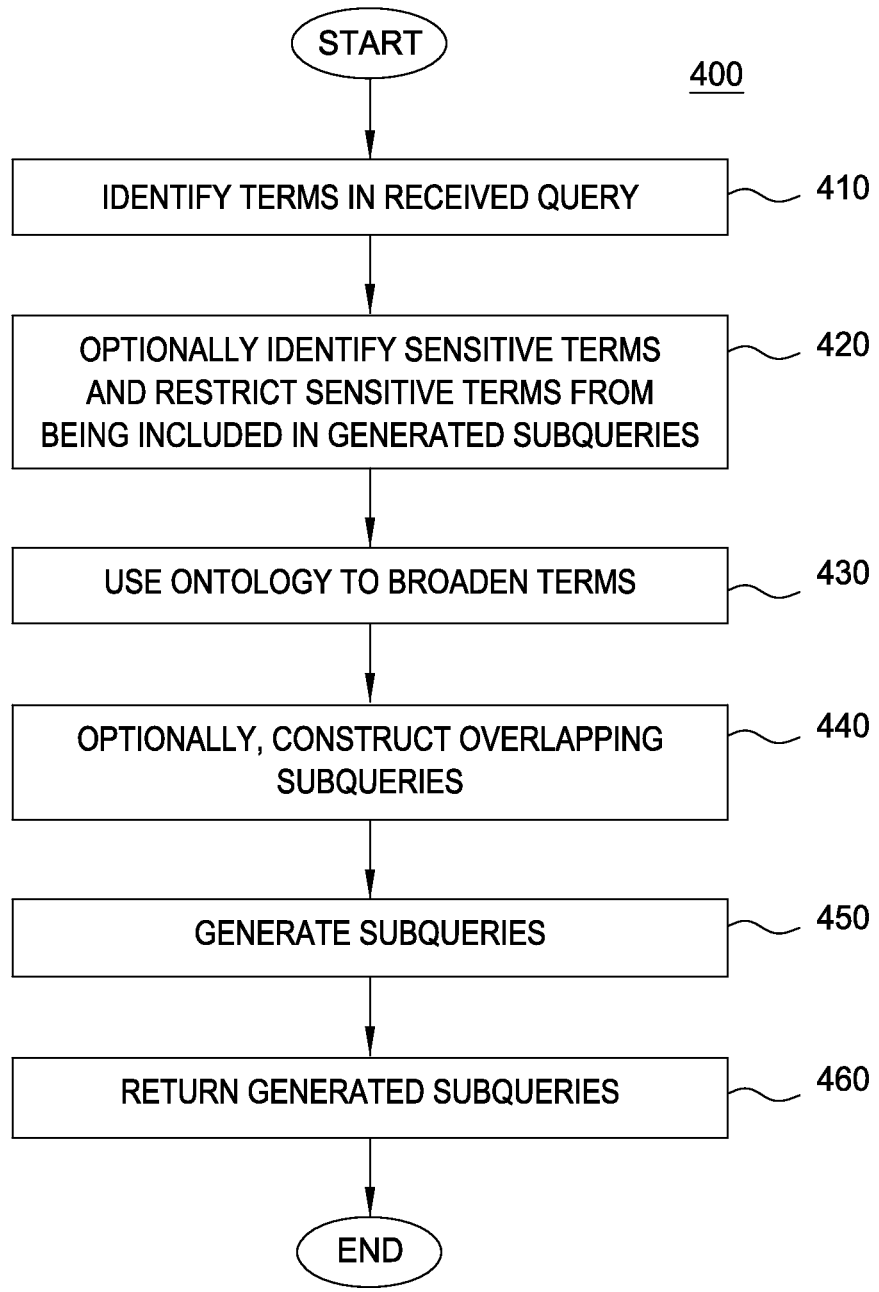
FIG. 4 is a flow chart illustrating a method to construct broadened queries, according to one embodiment.

FIG. 4 is a flow chart illustrating a method 400 corresponding to step 320 to construct broadened queries, according to one embodiment. Generally, a computer program executing the steps of the method 400 generates a number of subqueries for a received query. The subqueries may have fewer or broader elements relative to the received query, and are constructed such that no single subquery contains each of the original elements from the received query. However, all of the original elements from the received query are present in the subqueries as a whole. If a term in the received query is general or broad enough, it may appear unmodified in a subquery that contains a subset of the terms in the received query. In one embodiment, the query protector 214 performs the steps of the method 400.

At step 410, the query protector 214 may identify terms in the received query. The terms may include words, concepts, ideas, or any other unit of information. A query may have one or more terms, each of which must be reduced or broadened in the generated subqueries in order to protect the ideas, concepts, and other sensitive material that may be revealed without otherwise applying the techniques described herein. At step 420, the query protector 214 may optionally identify sensitive terms and restrict the sensitive terms from being included in the subqueries it generates. The sensitive terms may be marked by a user, or the query protector 214 may perform analytics on the terms of the query to identify sensitive terms. For example, the query protector 214 may determine the inverse document frequency (IDF) score of a term in order to determine how frequently it appears in the corpus of information being searched. The IDF score measures how often a term appears in a corpus, producing a low score for frequent terms, and a high score for infrequent terms. If the IDF score is above a specified threshold, the query protector 214 may determine that the word is too specific and or sensitive, and may exclude it from the subqueries. Additionally, the query protector 214 may identify where the terms are placed in the ontology. If the terms are at leaf nodes of the ontology, or near a leaf node, this may indicate that the terms are too specific, and should be marked as sensitive words.

At step 430, the query protector 214 broadens the terms of the received query by referencing an ontology to identify synonyms and hypernyms of the terms. For example, if the search query specifies "banana peel power cell," the query protector 214 may reference the ontology 216 to identify the word "fruit" as a hypernym of the word "banana," and include this broader term in one or more generated subqueries. The query protector 214 uses keywords to broaden the query terms, and the keywords may be based on specific domains. At step 440, the query protector 214 may optionally construct overlapping subqueries, such that specificity in one subquery is offset by generality in another subquery. At step 450, the query protector 214 may generate the subqueries. Generally, any number of subqueries may be generated. In one embodiment, the query protector 214 generates one subquery for each term in the received query. The number of subqueries generated may be modified based on user preferences. For example, a user may iteratively increase the number of generated subqueries if the search does not yield acceptable results. At step 460, the query protector 214 returns the generated subqueries which may then be sent to one or more search engines for execution.

Advantageously, embodiments disclosed herein obfuscate search queries to protect the confidentiality and secrecy of terms, concepts, and ideas stored therein. Embodiments disclosed herein reference an ontology to identify synonyms and hypernyms of each element of the query. Using these synonyms and hypernyms, a plurality of broader or reduced subqueries may be generated, such that no single subquery has each element of the original query, but that in combination, the subqueries contain all of the elements. The subqueries may be executed on one or more search engines to retrieve respective result sets. The original search query terms may then be applied against the result sets as a whole to produce a result set which is tailored to the original search query.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access search engines or related data available in the cloud. For example, the query protector could execute on a computing system in the cloud and obfuscate concepts in a query to preserve the secrecy of the concepts. In such a case, the query protector could broaden terms in the query to create a plurality of subqueries, and store the results of the subqueries at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying, from a plurality of terms of a received query, a plurality of sensitive terms based on: (i) user input received with the query, (ii) an inverse document frequency (IDF) score of each term of the query, and (iii) a location of a respective node associated with each term of the query in an ontology;
   referencing the ontology to identify a set of generalized terms corresponding to the plurality of sensitive terms of the query;
   generating a plurality of subqueries, including a first subquery, a second subquery, and a third subquery based on the sensitive terms, a sensitivity score of each of the sensitive terms, and the set of generalized terms, wherein a first sensitive term of the plurality of sensitive terms is not one of the set of generalized terms and is excluded from each of the plurality of subqueries, wherein the third subquery is disassociated with the query, wherein the sensitivity scores are based on a predefined frequency threshold;
   executing each of the plurality of subqueries to retrieve a result set for each respective subquery;
   identifying, in a first result set corresponding to the first subquery, the first sensitive term;
   determining that the first sensitive term is not present in a second result set corresponding to the second subquery;
   applying a greater weight to the first result set corresponding to the first subquery relative to the second result set corresponding to the second subquery based on the first sensitive term being present in the first result set and not in the second result set; and
   filtering the result sets using the plurality of terms of the query, including the plurality of sensitive terms, to produce a final result set responsive to the query.

2. The method of claim 1, wherein the final result set includes at least one result from the first result set, wherein the greater weight applied to the first result set is further based on a publication source of at least one result in the first result set, wherein the publication source is not a search engine and corresponds to an entity publishing the at least one result, wherein each subquery includes at least one of: (i) at least one generalized term of the set of generalized terms, and (ii) a subset of terms of the at least one term of the query, wherein the plurality of subqueries are generated responsive to user input specifying to generate the subqueries, wherein the method further comprises:
   merging the result sets after executing each of the plurality of subqueries.

3. The method of claim 2, wherein at least two subqueries of the plurality of subqueries are executed on different search engines.

4. The method of claim 3, wherein the set of generalized terms includes at least one broader term corresponding to the at least one term of the query.

5. The method of claim 4, wherein generating the plurality of subqueries further comprises:
   computing the sensitivity score for each sensitive term; and
   upon determining the sensitivity score for the respective sensitive term exceeds a threshold, restricting the plurality of subqueries from including the respective sensitive term.

6. The method of claim 5, wherein the sensitivity scores are computed based on: (i) the IDF score of the respective sensitive term in a corpus, wherein the sensitivity scores are increased upon determining the IDF score of the respective sensitive term exceeds the predefined frequency threshold, wherein the frequency threshold specifies a threshold number of occurrences of the respective sensitive term in the corpus, and (ii) whether the respective sensitive term is a low level node of the ontology.

7. The method of claim 6, wherein the first subquery and the second subquery, of the plurality of subqueries, are constructed to offset broadness in the first subquery with specificity in the second subquery by: (i) including, in the first subquery, a hypernym corresponding to a third sensitive term of the plurality of sensitive terms, and (ii) including the third sensitive term in the second subquery.

8. The method of claim 7, further comprising:
   obfuscating the received query by executing the first subquery at a first time and executing the second subquery at a second time, different than the first time.

9. The method of claim 8, wherein the filtering is performed by a respective server hosting a respective search engine executing the plurality of subqueries.

* * * * *